June 17, 1930.   F. M. EDGAR ET AL   1,763,690
LEVER CONTROL ASSEMBLY
Filed Jan. 24, 1927

INVENTORS
FRANK M. EDGAR
JOHN B. FLYNN
BY
ATTORNEY.

Patented June 17, 1930

1,763,690

UNITED STATES PATENT OFFICE

FRANK M. EDGAR AND JOHN B. FLYNN, OF DETROIT, MICHIGAN, ASSIGNORS TO TERNSTEDT MANUFACTURING COMPANY, OF DETROIT, MICHIGAN, A CORPORATION OF MICHIGAN

LEVER-CONTROL ASSEMBLY

Application filed January 24, 1927. Serial No. 163,030.

This invention relates to a lever control assembly of a type which is especially useful for various controls in the interior of an automobile.

The invention is concerned more particularly with a snap-over control lever wherein there is a spring action which tends to force the lever to snap over a point of maximum spring distortion and to assume a position angularly, one way or another, with respect to its mounting. Snap-over controls are not broadly new, and one is shown for controlling a dogging mechanism of a lock on the door of an automobile, to prevent opening of the door from the outside, except by use of a proper key, in the patent to Thomas P. Archer et al. No. 1,541,312.

The present invention aims to provide a complete lever assembly wherein the lever is permanently and pivotally mounted in its support for automobile use. This support preferably takes the form of an escutcheon plate adapted to be secured to the inner wall of an automobile. The invention further contemplates a mounting for the lever so that an escutcheon plate, which is longer than it is broad, may be mounted vertically, horizontally, or angularly and the lever pivoted in a vertical plane in either instance, and for this purpose the mounting of the lever takes the form of a ball-and-socket joint. The assembly can be economically manufactured, and in its completed form represents a unit construction which can be easily handled in stock and which can be easily installed by attachment of the escutcheon plate to a wall structure. It is preferable to include a spring and a friction washer in the assembly so that the entire unit is ready to be mounted for use.

Figure 1:
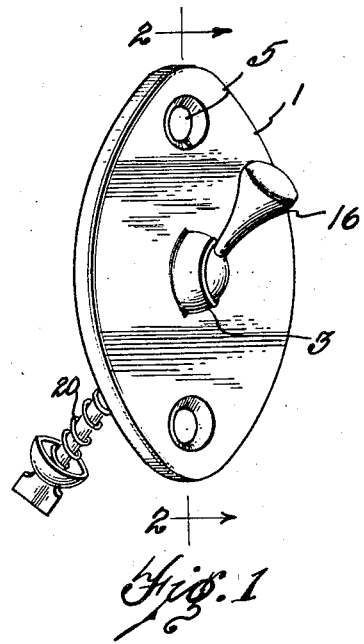
Fig. 1 is a perspective view of the assembly.

The assembly is composed of an escutcheon plate 1 which has a central aperture 2, and around this aperture the metal of the plate is depressed, as shown at 3. The plate is also provided with apertures 5, and the metal around the apertures is depressed, as shown at 6, to form counter-sunk openings for receiving screws 7. The screws mount the escutcheon plate and may be either wood screws or machine screws, depending upon the nature of the wall structure.

Mounted on the back of the escutcheon plate is a plate 10 which is provided with apertures 11 which correspond with the apertures 5 in the escutcheon plate. The counter-sunk metal portions 6 of the escutcheon plate project through the apertures 11, and the metal is then turned over or riveted, as shown at 12, to secure the two plates together. The plate 10 is also provided with a central opening 14 around which the metal is depressed, as at 15, and when the two plates are put together the portions 3 and 15 cooperate to form a socket. The edges of the escutcheon plate are preferably turned over, as at 8, to hide the rear plate and present a more pleasing effect when in use.

A lever 16 is provided with an enlarged portion 17 which fits within the socket. Preferably the enlarged portion 17 is spherical and the socket is correspondingly shaped. In assembling the structure the lever may be put into position before the two plates are secured together so that when the plates are secured together the lever is fixed in place. However, if desired, one of the socket-forming portions 3 or 15 may be sufficiently large to permit insertion of the lever after the plates are put together, and then this metal of the socket portion may be shaped to hold the lever therein.

Mounted upon one end of the lever is a coil compression spring 20 held in place by a washer 21 which is preferably of cupped formation, as shown. For holding the spring and washer in place the end of the lever may be flattened, as shown at 22.

Figure 3:
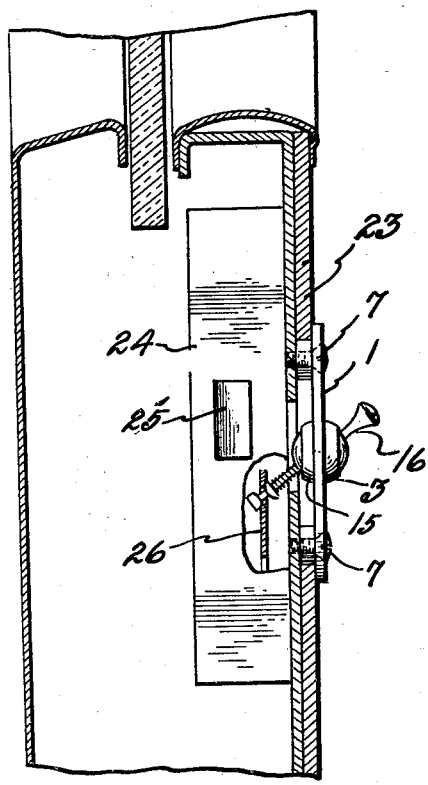
Fig. 3 is a sectional view taken through part of a door of an automobile showing how the assembly may be used for controlling the dogging mechanism of a lock.
Figure 2:
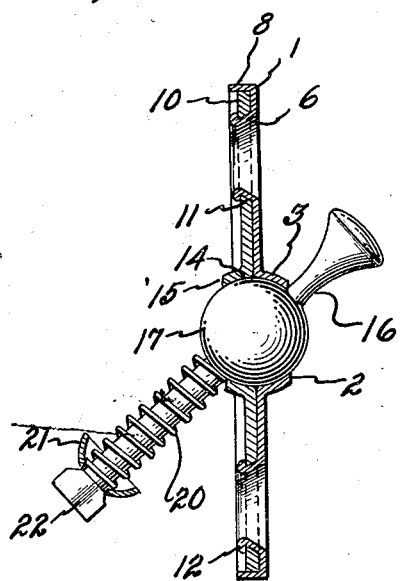
Fig. 2 is a sectional view taken on line 2—2 of Fig. 1 showing how the lever is mounted in the escutcheon plate.

A door of an automobile is shown in Fig. 3, and it will be seen that the escutcheon plate is mounted by means of the screws on the interior surface 23 of the door. A lock 24, having a bolt 25, is prevented from being opened from the outside by means of a dog 26. The inner end of the lever engages the dog 26 and is controlled by the movements of the lever. It will be seen that as the lever is moved, the spring becomes compressed as the lever assumes a position at right angles to the wall, whereupon the spring causes the lever to snap over to the opposite side.

For the purpose of convenience the assembly has been described as useful for automobiles, and more especially for automobile door locks. However, it will be readily seen that the assembly can be used for other purposes and in other places, as for example, for controlling switches of electrical systems.

The manufacture of the assembly is expedited by connecting the escutcheon plate and the rear plate by turning over the metal which is depressed to form screw openings. However, it is within the scope of the invention to connect the two metal plates in other ways. It will be seen that the escutcheon plate may be mounted vertically, horizontally or angularly, depending upon the interior decorative scheme of the automobile, and the lever can be pivoted in a vertical plane or horizontal plane, as desired, in any position of the escutcheon plate.

Claim:

A lever control assembly comprising in combination a plate with a spherical depression surrounding an opening, an escutcheon with a sperical depression surrounding an opening arranged to register with the first mentioned opening, a lever with a ball portion trapped in the spherical socket formed by the depressions when the plate and escutcheon are secured together, the said plates being provided with registering counter-sunk screw openings in which the edges of the openings in the escutcheon are passed through the openings in the plate and riveted over to secure the escutcheon and plate together, a coil spring fixedly mounted around the lever and engaging between the end of the lever and the ball portion, the end of the lever being arranged to connect up with a controlled device having a prescribed path of movement which intersects the arc through which the end of the lever swings, whereby the movement of the lever compresses the spring until the lever has passed the median point of its movement, whereupon the spring snaps the lever and the controlled member to the other extreme of their movement.

In testimony where we affix our signatures.

FRANK M. EDGAR.
JOHN B. FLYNN.